United States Patent [19]

Shwayder

[11] Patent Number: 4,607,781
[45] Date of Patent: Aug. 26, 1986

[54] METHOD OF MANUFACTURING AN ADJUSTABLE MOUNTING SNOW PLOW SKID SHOES

[76] Inventor: Warren M. Shwayder, 2335 E. Lincoln, Birmingham, Mich. 48008

[21] Appl. No.: 694,601

[22] Filed: Jan. 24, 1985

[51] Int. Cl.$^4$ ............................................. B23K 31/00
[52] U.S. Cl. ................................... 228/175; 228/189
[58] Field of Search ................. 37/270, 271; 172/832; 29/526, 148.3; 228/175, 182, 212, 189; 219/107, 137

[56] References Cited

U.S. PATENT DOCUMENTS

| | | | |
|---|---|---|---|
| 1,989,967 | 2/1935 | Bornstein | 29/148.3 |
| 2,467,311 | 4/1949 | Hudson | 29/148.3 |
| 3,002,272 | 10/1961 | Hodges | 228/189 |
| 3,588,147 | 6/1971 | Enters | 37/270 |
| 4,125,950 | 11/1978 | Mashford | 37/271 |
| 4,346,528 | 8/1982 | Shwayder | 37/271 |
| 4,450,635 | 5/1984 | Shwayder | 29/526 |

OTHER PUBLICATIONS

Procedure Handbook of Arc Welding Design and Practice, 1945, p. 669, by Lincoln El. Co.
Metals Handbook, 8th Edition, by ASM Handbook Committee, 1971, p. 14.

*Primary Examiner*—Nicholas P. Godici
*Assistant Examiner*—M. Jordan
*Attorney, Agent, or Firm*—Cullen, Sloman, Cantor, Grauer, Scott and Rutherford

[57] ABSTRACT

A snow plow skid shoe is formed of a mounting plate, which is bolted upon the rear face of a plow moldboard, and a skid plate having a bottom, ground engaging, surface. The plow is positioned so that the lower edge of the blade, which is bolted upon the forward face of the moldboard, rests upon the ground. Then the skid plate is supported upon the ground and is manually freely moved relative to the mounting plate until its ground engaging surface is leveled and aligned with the snow plow blade ground engaging edge and the closely adjacent plates form an acute angle. A rigid, fixing member, is moved into the acute angle space until it contacts both plates and then is welded to both plates for fixing the position of the skid plate. Thereafter, the mounting plate may be unbolted, for moving the skid shoe to an accessible place where the plates may be welded together along their adjacent edges and the fixing member to form a rigid, permanently adjusted shoe for the particular plow upon which it may then be re-bolted for use.

4 Claims, 9 Drawing Figures

U.S. Patent    Aug. 26, 1986    4,607,781
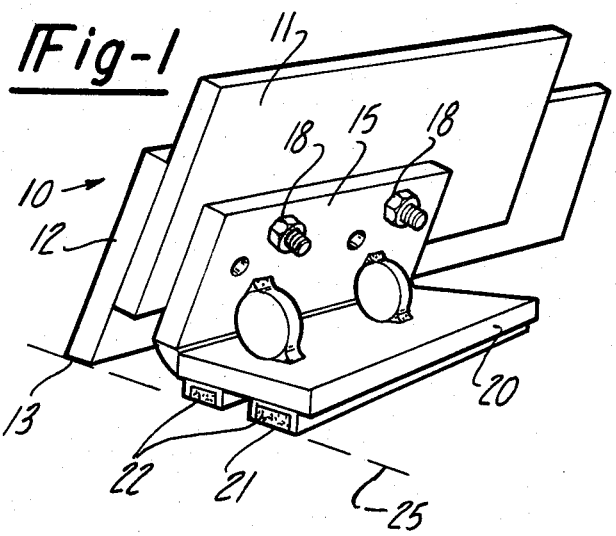
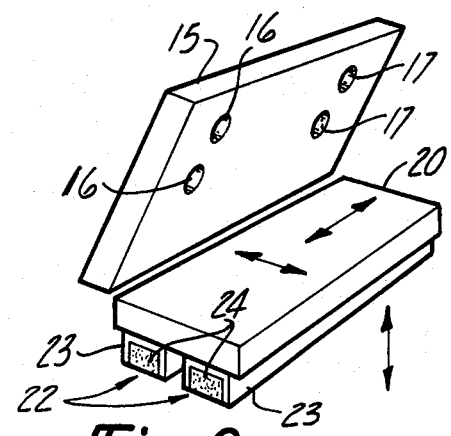
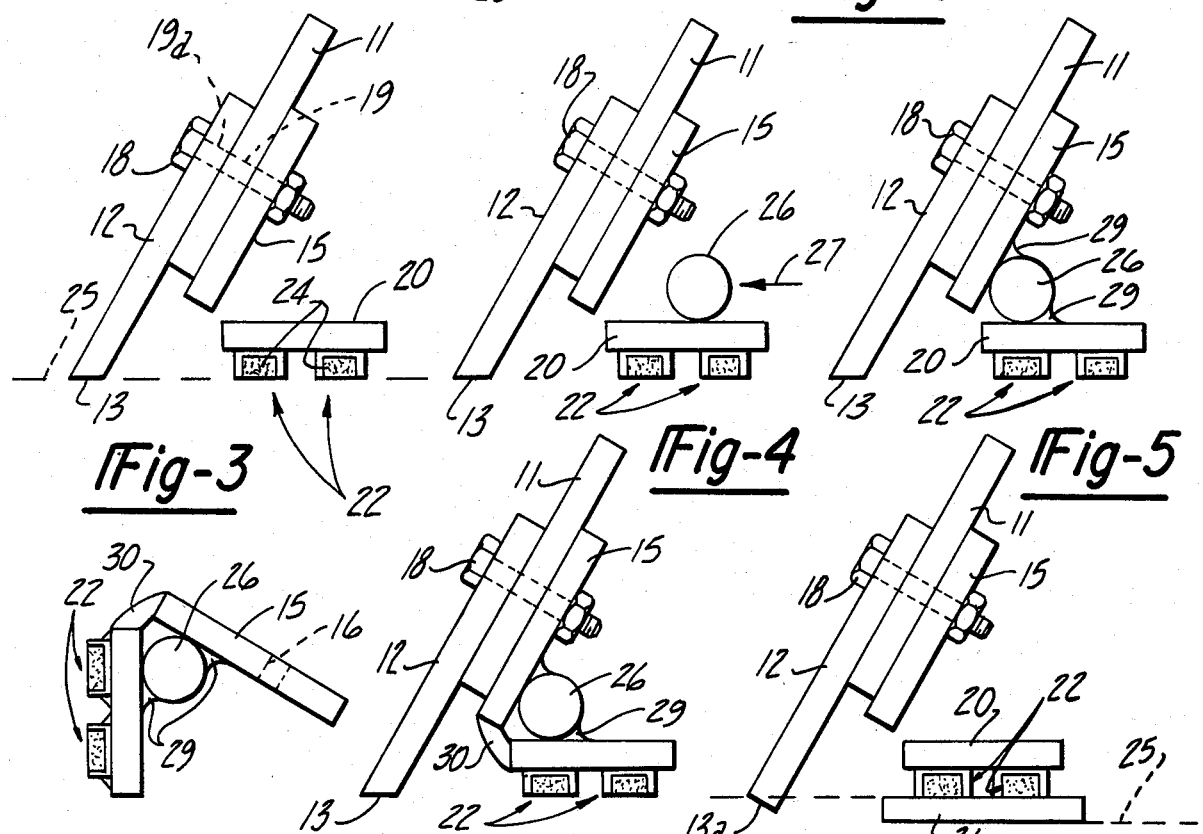
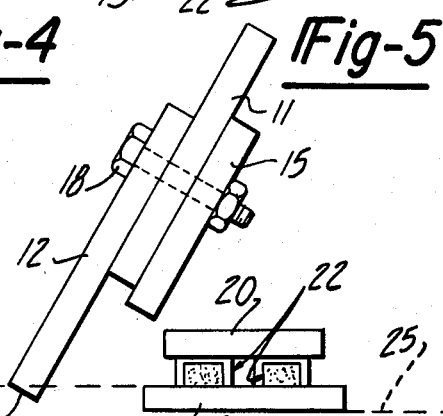
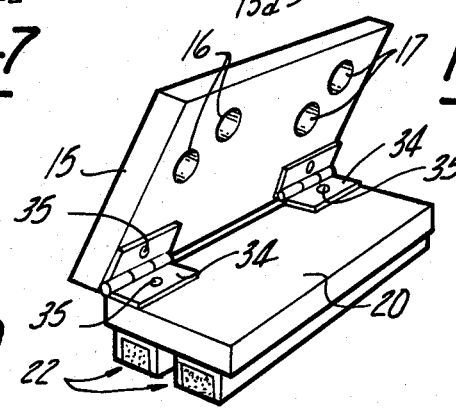

METHOD OF MANUFACTURING AN ADJUSTABLE MOUNTING SNOW PLOW SKID SHOES

BACKGROUND OF INVENTION

Snow plows are usually provided with skid shoes that are mounted upon the lower, rear portions of the plow moldboards for supporting and guiding the plow blade ground engaging edge upon or slightly above the ground. One type of skid shoe involves an approximately horizontally arranged skid plate which slides upon the ground and which may have wear resistant, ground engaging surface. The plate is part of a skid shoe construction which includes brackets for bolting the plate to the moldboard of the plow in a way that aligns the ground engaging surface with the lower, ground engaging edge of the plow blade which is also bolted to the moldboard. An example of this type of skid shoe construction is illustrated in my U.S. Pat. No. 4,346,528 issued Aug. 31, 1982.

Because the ground engaging edges of plow blades wear out or become damaged, they may be replaced from time to time. Likewise, skid shoes also may become damaged or too worn for further use and must be replaced. Replacing a skid shoe with a new shoe in such a way as to provide good, leveled alignment between the ground engaging face of the shoe and the ground engaging edge of the plate is difficult. There are slight differences in the alignment, shapes and sizes of blades, moldboards and skid shoe locations from one plow to another, particularly after the plow has been used for some while. Thus, it is desirable to have a skid shoe construction which is adjustable to the particular plow upon which it is mounted in order to obtain the best possible alignment.

My prior U.S. patent application, Ser. No. 422,800, filed Sept. 24, 1982, now U.S. Pat. No. 4,450,635 discloses a level adjustable skid shoe and a method for leveling the shoe which, in general, involves fastening a mounting bracket to the moldboard, with the skid shoe plate hingedly connected to the bracket. Thereafter, the plow blade is moved into ground engagement position which moves the skid plate into substantial alignment therewith. At that point the skid shoe and bracket are permanently fastened together by welding.

While the foregoing form of adjustable skid shoe is generally satisfactory, at times further adjustment may be desirable or needed in order to get good surface to surface contact of the entire bearing surface of the skid shoe against the ground. That is, in some instances, the vertical location of the bracket is such that the skid shoe ground engaging surface may be angled slightly upwardly or downwardly so that it does not fully engage the ground. This results in uneven wear.

Thus, the invention herein is concerned with providing a skid shoe in the form of kit-like parts which may be assembled to a specific moldboard of a plow. Initially, the skid plate is substantially freely, manually adjustable in all directions to assure even surface to surface engagement with the ground and good alignment with the plow blade.

SUMMARY OF INVENTION

This invention contemplates a system for adjustably mounting a skid shoe on a plow moldboard by which the skid surface that slide along the ground may be leveled and aligned with the ground engaging edge of the plow blade. Thus, the skid plate, which may have a wear resistant surface formation, such as hard, tungsten carbide or the like wear pads for sliding upon the ground, is aligned with the blade edge and is temporarily tacked in aligned position to a skid shoe mounting plate which is bolted to the moldboard. After the aligning procedure, which may involve manually moving the skid plate until it is in good face to face contact with the ground, and then tacking it to the mounting plate, the mounting plate may be removed from the moldboard by releasing the bolts. Thereafter, the mounting plate with the temporarily fixed skid plate can be brought to a suitable location for permanently welding the two plates together in their properly aligned position. Then the mounting plate may be re-bolted or reinstalled upon the moldboard to permanently position the skid surface for supporting and guiding the plow blade upon the ground.

The invention contemplates temporarily tacking or fixing the skid plate in its aligned position relative to the mounting plate by means of a solid, rigid fixing member which may be in the form of a cylindrical bar of disk or rod that is rolled into the acute angle space formed by the mounting plate and skid plate. By pushing the fixing member as deep as it will go towards the apex or adjacent joining edges of the plates, the member will abut each of the plates, at which point it may be tack welded to them for holding the plates in fixed position until the complete welding is accomplished.

The skid shoe may be provided in the form of a knock-down kit having a mounting plate with pre-drilled holes, a skid plate with a hardened surface, e.g., hard carbide wear pads, and a fixing member in the form of one or more substantially circular disks or rods or the like and bolts. Actually, some of the same bolts that fasten the conventional elongated plow blade to the moldboard may be used to bolt the mounting plate to the moldboard. With this construction, the skid plate initially is free of attachment to the mounting plate. Thus, it may be laid upon the ground adjacent the mounting plate when the plow blade is lowered into contact with the ground and then manually aligned by moving it towards and away from, sideways and lengthwise relative to the mounting plate. Then it is fixed in position by the fixing member and the tack welding.

Alternatively, the skid plate may be hingedly connected to the mounting plate by means of a relatively lightweight, inexpensive piano hinge or similar leaf type of hinge which keeps the two plates together and permits them to pivot relative to each other around the hinge axis. Thus, when the skid plate rests upon the ground while the mounting plate is bolted to the moldboard and plow blade is in contact with the ground, if the skid surface rests in full surface to surface contact with the ground, the fixing member and tack weld may be used. However, if there is misalignment, such as due to imprecise bolt hole locations, etc., and the skid plate is tipped out of full ground contact, or level alignment with the blade, then the hinge may be disengaged from at least one of the two plates. This frees the skid plate so that it may be manually moved in all directions and thereafter, fixed in position. The disengagement of the hinge can be achieved by disengaging the fastener that secures the hinge leaf to either of the plates or even by breaking the hinge if it is sufficiently lightweight.

As can be seen, an object of this invention is to provide a simplified system, utilizing a kit of parts which can be readily assembled, to produce proper leveling and alignment of the skid surface with a specific snow plow and blade used. Thus, the skid shoe, when properly leveled aligned will wear evenly so that its life will be maximized. Moreover, its protection of the plow blade will likewise be maximized.

Further objects and advantages of this invention will become apparent upon reading the following description, of which the attached drawings form a part.

DESCRIPTION OF DRAWINGS

FIG. 1 is a perspective, fragmentary view of the lower, left edge, of a plow moldboard, blade and a skid shoe mounted thereon.

FIG. 2 is a perspective view of the skid shoe.

FIG. 3 is an elevational view showing the first step in adjusting the skid shoe to a specific plow blade.

FIG. 4 shows the step of positioning the fixing or bridging member during adjustment of the skid plate.

FIG. 5 illustrates the fixing member tack welded in place.

FIG. 6 shows the step of welding the shoe after its removal from the plow moldboard.

FIG. 7 illustrates the permanently welded, completely assembled skid shoe remounted upon the plow moldboard.

FIG. 8 is a view similar to FIG. 3, but showing the positioning of the skid plate to accomodate to a squared edge plow blade.

FIG. 9 illustrates a modification wherein the skid blade is temporarily hingedly connected to the mounting plate.

DETAILED DESCRIPTION

Referring to FIG. 1, the snow plow 10 includes the conventional moldboard 11, upon whose forward face the blade 12 is mounted. The blade includes a ground engaging edge 13 which may be angled or chisel shaped.

The skid shoe includes an upper mounting plate 15 which is positioned upon the rear face of the moldboard. Pairs of bolt holes 16 and 17, or alternatively bolt receiving slots (not shown), are formed in the mounting plate to receive bolts 18 which fasten the mounting plate upon the moldboard. Preferably, the bolts 18 extend through the already present holes 19 and 19a in the moldboard and blade so that some of the same bolts that fasten the blade also secure the skid shoe to the moldboard.

The lower skid plate 20 includes a bottom, ground engaging surface formation 21 which preferably is in the form of pads 22 secured, as by welding, to the metal skid plate. These pads may be made of steel channels 23, or completely enclosed tubes, filled with a matrix 24 made of hard carbide particulate material embedded within a filler made of a copper-type brazing material or other suitable material. Other ground engaging formations may be used which are sufficiently wear resistant for the purpose.

The skid plate 20, as illustrated by the arrows in FIG. 2, is moved towards and away from the mounting plate, longitudinally of the mounting plate and up and down, as required to obtain a good alignment with the ground engaging edge of the blade. For that purpose, during installation, the blade is lowered, by operating the tractor plow mechanism, until the blade rests upon the ground. With the shoe mounting plate secured to the moldboard, the skid plate can then be freely moved about manually, while resting upon the ground surface, until it is suitably positioned in good face to face contact with the ground and in alignment with the ground engaging edge of the blade. The alignment of the shoe plate with the blade is illustrated in FIG. 3, relative to a reference line 25 representing the ground.

Once the parts are aligned upon the ground, a fixing or bridging membewr 26 is positioned into the acute angle space between the mounting plate and the skid plate. As illustrated in FIG. 4, the fixing member may be in the form of cylindrical disks or of a cylindrical rod or the like, which is pushed or rolled, as illustrated by the arrow 27 in FIG. 4, into the apex of the acute angle.

With the bridging member positioned in contact with both plates, as shown in FIG. 5, it may be tack welded to the plates by welds 29 to temporarily fix the members together. This sets the alignment of the skid plate ground engaging surface with the blade.

Following the temporary fixing of the parts, the mounting plate can be removed from the moldboard, by disengaging the bolts 18. Then, the temporarily assembled skid shoe may be taken to a convenient or accessible location for welding the plates together, such as illustrated by the edge weld in FIG. 6. For this purpose, the plates may be arranged at the appropriate angle for proper welding.

After the parts are welded and permanently fixed in position, as illustrated in FIG. 7, the skid shoe can be re-bolted or remounted back upon the plow moldboard for use.

FIG. 8 illustrates a situation where the lower, ground engaging edge 13a of the blade is squared, as would be the case with a new blade. Where the blade edge is initially square, it typically is worn to a chisel edge, comparable to the edge 13, after a period of use. Thus, to accomodate for the change in edge shape, the skid plate 20 may be positioned upon a board or plate 31 which elevates it slightly above ground. Thus, the skid plate initially is a short distance above, the plane of contact between the blade and the ground. However, once the blade wears to its chisel edge, the ground engaging surface of the skid plate will then properly engage the ground as required.

Referring to FIG. 9, the mounting plate and skid plate may be temporarily secured together with suitable hinges 34 for handling and for ease in initially aligning the parts. Either a series of separate hinges, or a longer piano-type hinge may be used. The hinge leaves are secured to the plates by conventional screws or pins 35 which may be removed or loosened, as will be described below.

In initially aligning the skid plate, the mounting plate is bolted to the moldboard in the same manner as mentioned above. However, where the moldboard holes or the blade lengths are not exactly as anticipated, so that the skid plate does not rest fully in face to face contact with the ground, i.e., tilting slightly upwardly or downwardly and making only partial contact with the ground, the skid plate may be detached from the mounting plate. That is, by removing or loosening the screws or pins 35 on either or both of the leaves of the hinges, the skid plate is loosened sufficiently so that it may be pivoted into a better ground engaging position. Alternatively it may be moved longitudinally or upwardly or downwardly. Ordinarily simply loosening the screws gives sufficient play to permit adjustment. However, where more adjustment is required, the screws or pins may be removed entirely during the time of alignment and the skid plate may be freely manually moved about in the same manner as illustrated in FIG. 3.

Once the skid plate is aligned, the fixing or bridging member 26 is applied. Thereafter, the parts are permanently secured together in the same manner described above.

The skid shoe of this invention can be provided in the form of a kit with the necessary parts available to be used to replace worn out skid shoes or to be installed when a new blade is installed upon the plow moldboard. As can be seen, each specific skid shoe is leveled and aligned and adjusted for good surface to surface contact for its specific plow blade and moldboard. Yet, the task of assemblying the skid shoe is simple and involves minimal labor. The resulting construction provides for maximum life for the skid shoe and maximum protection for the plow blade.

Having fully described an operative embodiment of this invention, I now claim:

1. A method for adjustably mounting a skid shoe upon a plow moldboard in horizontal alignment with the ground engaging edge of the plow blade which is fastened to and extends beneath the moldboard forward face, comprising:

bolting a mounting plate, which has a lower horizontal edge, upon the rear face of the moldboard;

supporting a lower, skid plate, which has a bottom, ground engaging surface, upon the ground while the plow blade ground engaging edge is supported upon the ground, with the skid plate forming an acute angle with the mounting plate and being closely adjacent the mounting plate;

adjusting the skid plate for aligning its ground engaging surface with the plow blade edge;

moving a generally cylindrically shaped loose, fixing spacing member, which is initially unattached to either plate, within the acute angle space between the plates towards the adjacent edges of the plates until the cylindrical surface of the member forms line contacts with the adjacent surfaces of each of the plates and bridges the space between the plates;

welding the member to both of the plates adjacent the locations of the line contacts between the member and the plates;

removing the plates from the moldboard and moving the plates to an accessible place so as to make their adjacent edges accessible for complete welding, and then welding the adjacent plates edges together, while the plates are fixed together by the member, for producing a permanently adjusted skid shoe for sliding upon the ground in horizontal alignment with the blade edge.

2. A method as defined in claim 1, and with said plates being initially free of each other, including freely adjusting the position of the skid plate angularly, along the length of and towards and away from the mounting plate for desired alignment with the blade edge prior to welding the fixing member to the plates.

3. A method as defined in claim 1, and including temporarily pivotally connecting together the adjacent edges of the plates by a pivotable hinge means which is connected to each of the plates together, before bolting the mounting plate upon the moldboard, and disengaging the hinge means from at least one of the plates for freely adjusting the lower plate prior to welding the fixing member of the plates where adjustments other than pivotal adjustments are required for aligning the skid shoe ground engaging surface relative to the blade member.

4. A method as defined in claim 1, and wherein the fixing member comprises at least two round disks whose axial lengths are considerably less than their diameter, and positioning said disks a distance apart from each other, between the plates, and separately welding each of the disks, at their lines of contact, to each of the plates.

* * * * *